United States Patent
St. John et al.

(10) Patent No.: US 9,009,693 B2
(45) Date of Patent: Apr. 14, 2015

(54) OUT-OF-BAND FRAMEWORK LIBRARIES WITHIN APPLICATIONS

(71) Applicant: Microsoft Corporation, Redmond, WA (US)

(72) Inventors: Eric St. John, Kirkland, WA (US); Mohammad Rahim Bhojani, Bothell, WA (US); Alok Shriram, Redmond, WA (US); David Kean, Redmond, WA (US); Divya Swarnkar, Redmond, WA (US); Kumar Gaurav Khanna, Woodinville, WA (US); Gaye Oncul Kok, Redmond, WA (US); Jan Kotas, Redmond, WA (US); Michael J. Rayhelson, Bellevue, WA (US); Michael Rousos, Massillon, OH (US); Weitao Su, Sammamish, WA (US); Matthew Charles Cohn, Seattle, WA (US); Zhanliang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 13/889,469

(22) Filed: May 8, 2013

(65) Prior Publication Data

US 2014/0337824 A1 Nov. 13, 2014

(51) Int. Cl.
*G06F 9/44* (2006.01)
*G06F 9/445* (2006.01)

(52) U.S. Cl.
CPC ........ *G06F 9/44521* (2013.01); *G06F 9/44536* (2013.01)

(58) Field of Classification Search
None
See application file for complete search history.

(56) References Cited

U.S. PATENT DOCUMENTS 6,550,060 B1 * 4/2003 Hammond .................... 717/162
6,629,111 B1 * 9/2003 Stine et al. .......................... 1/1

(Continued)

OTHER PUBLICATIONS

.NET Framework Assembly Unification Overview, .NET Framework 4.5, 2011, 4 pages, [retrieved on Aug. 6, 2004], Retrieved from the Internet: <URL:http://web.archive.org/web/20111210061623/http://msdn.microsoft.com/en-us/library/db7849ey(v=VS.110).aspx>.*

(Continued)

*Primary Examiner* — Thuy Dao
*Assistant Examiner* — Geoffrey St Leger
(74) *Attorney, Agent, or Firm* — Kevin Sullivan; Kate Drakos; Micky Minhas

(57) ABSTRACT

An enhanced binder provides flexibility and certainty when selecting a version of a software library to load, and an enhanced loader prevents a library version vulnerable to a security flaw from being loaded. The binder can perform unification, implicit override, and/or redirection. Implicit override searches assembly-specific locations for an implicit_version, and override the previously chosen unification or other version with the implicit_version when the implicit_version is greater. The implicit_version gets updated with the individual assembly, whereas the unification_version gets updated with the framework. Redirection may override the implicit_version. Unlike redirection, an implicit_version does not recite an explicit range and is found outside application configuration files. The implicit_version is specified implicitly by the assembly without an XML declaration. Vulnerable libraries are not loaded, based on out-of-band metadata placed in response to a list of known out-of-band assemblies, an out-of-band-servicing attribute, or a custom servicing library.

20 Claims, 4 Drawing Sheets

(56) References Cited

U.S. PATENT DOCUMENTS

| | | | |
|---|---|---|---|
| 7,073,170 B2* | 7/2006 | Grier et al. | 717/162 |
| 7,565,686 B1* | 7/2009 | Sobel et al. | 726/2 |
| 8,037,453 B1 | 10/2011 | Zawadzki | |
| 8,291,401 B2* | 10/2012 | Gray et al. | 717/162 |
| 8,381,176 B1 | 2/2013 | Bentley et al. | |
| 8,595,715 B2* | 11/2013 | Ward et al. | 717/170 |
| 8,793,676 B2* | 7/2014 | Quinn et al. | 717/163 |
| 8,892,954 B1* | 11/2014 | Gray et al. | 714/38.11 |
| 2003/0046673 A1* | 3/2003 | Copeland et al. | 717/163 |
| 2005/0166196 A1* | 7/2005 | Grier et al. | 717/162 |
| 2006/0026584 A1* | 2/2006 | Muratori et al. | 717/163 |
| 2006/0136890 A1* | 6/2006 | Jodh | 717/163 |
| 2006/0173937 A1* | 8/2006 | Sia et al. | 707/205 |
| 2007/0204263 A1* | 8/2007 | Nathan et al. | 717/168 |
| 2008/0134221 A1* | 6/2008 | Dadiomov | 719/331 |
| 2011/0239195 A1 | 9/2011 | Lin et al. | |
| 2012/0174124 A1* | 7/2012 | Ward et al. | 719/331 |
| 2012/0210300 A1 | 8/2012 | Trofin et al. | |
| 2012/0240106 A1 | 9/2012 | Lander et al. | |
| 2012/0272204 A1 | 10/2012 | Olewski et al. | |
| 2013/0332917 A1* | 12/2013 | Gaither et al. | 717/170 |

OTHER PUBLICATIONS

Heege, M., Expert C++/CLI: Chapter 4—Assemblies, Metadata, and Runtime Services, 2007, 23 pages, [retrieved on Dec. 8, 2014], Retrieved from the Internet: <URL:http://link.springer.com/chapter/10.1007/978-1-4302-0357-5_4#>.*

Redirecting Assembly Versions, .NET Framework Apr. 5, 2012, 4 pages, [retrieved on Dec. 8, 2014], Retrieved from the Internet: <URL:https://web.archive.org/web/20120107191334/http://msdn.microsoft.com/en-us/library/7wd6ex19(v=VS.110).aspx>.*

"Application Lifecycle Management in SharePoint 2010", Retrieved at <<http://msdn.microsoft.com/en-us/library/gg604045(v=office.14).aspx>>, Feb. 2011, pp. 29.

Greenfield, Jack., "Software Factories: Assembling Applications with Patterns, Models, Frameworks, and Tools", Retrieved at <<http://msdn.microsoft.com/en-us/library/ms954811.aspx>>, Nov. 2004, pp. 16.

"Assemblies and the GAC", Retrieved at <<http://www.mono-project.com/Assemblies_and_the_GAC>>, Mar. 7, 2013, pp. 12.

"How to Update your Computer with the JPEG Processing (GDI+) Security Update", Retrieved at <<http://www.microsoft.com/en-us/download/details.aspx?id=27>>, Sep. 5, 2008, pp. 2.

"Step 4: Locating the Assembly through Codebases or Probing", Retrieved at <<http://msdn.microsoft.com/en-us/library/vstudio/15hyw9x3(v=vs.100).aspx>>, no later than Jan. 9, 2012, pp. 5.

"How the Runtime Locates Assemblies", Retrieved at <<http://msdn.microsoft.com/en-us/library/vstudio/yx7xezcf(v=vs.100).aspx>>, 2013, pp. 3.

".NET Framework Assembly Unification Overview", Retrieved at <<http://msdn.microsoft.com/en-us/library/vstudio/db7849ey(v=vs.100).aspx>>, 2013, pp. 3.

"International Search Report and Written Opinion Received for Patent Application No. PCT/US2014/037042", Mailed Date: Sep. 23, 2014, 12 Pages.

* cited by examiner

OUT-OF-BAND FRAMEWORK LIBRARIES WITHIN APPLICATIONS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some devices contain no software, and some contain only simple embedded software that is rarely if ever modified after being installed. But many different devices used today—such as smartphones, tablet computers, laptop computers, and modern automobiles, to name just a few—contain complex software which includes separate updateable libraries used by one or more applications. In some software development environments, some or all of these software libraries are part of a framework. Some of the commercially available software frameworks include Java® and JavaScript® frameworks (marks of Oracle America, Inc.), Oracle® Application Development Framework (mark of Oracle America, Inc.), various model-view-controller (MVC) frameworks, various web application frameworks, and the widely used Microsoft® .NET™ framework (marks of Microsoft Corporation).

Using separately updateable libraries promotes reuse of code, helps limit the recompilation needed when source code is changed, and helps organize large programs in ways that make them easier to develop and maintain. But the possibility that different versions of a library could be encountered when an application is invoked also creates challenges. These challenges are complicated by an established practice of updating framework libraries as a group, and by the fact that different libraries used in an application often are provided by—and updated by—different vendors.

SUMMARY

One of skill in the computing arts will understand that some of the embodiments described herein are directed to the technical problem of providing both flexibility and certainty when selecting a version of a software library to load in support of an application within a given operating context. It will also be understood that some embodiments are directed to the technical problem of efficiently and accurately determining whether a library version that is known to be vulnerable to a security flaw has ever been loaded in a given operating context. After a careful review of the present document, one of skill in the art will also acknowledge that the embodiments described herein are intended and constrained to exist and operate as computational components within one or more computing systems, that is, by executing software instructions. Accordingly, the embodiments cannot be effectively replaced by non-computational items such as mental processes of a human person, as mere abstractions, or as propagated signals per se.

In a computing system, when reference is made to a software library by an application program, a binder selects a version of the library to load in support of the application. Some of the embodiments described herein provide a binder which includes an implicit override portion. Implicit override is sometimes referred to herein as "app local," "application-local," or "AppLocal."

In some embodiments, a memory is in operable communication with processor(s), and a binder residing in the memory is enhanced by implicit override code. The binder is configured to interact with the processor and memory to determine which version of a referenced assembly will be identified to a loader for loading to support execution of an application. The terms "library" and "assembly" are used interchangeably herein to describe computational components which are individually versionable. A given assembly which has a version may be composed of and/or otherwise depend on other assemblies which have their own respective versions.

In some embodiments, the implicit override code includes code to search for an implicit_version in at least one assembly-specific location, code to compare the implicit_version to some other version after the implicit_version is found, and code to conditionally override the other version with the implicit_version when the implicit_version is greater than the other version. Version numbers typically increase over time, so a version X of an assembly will normally be "greater than" another version Y of the assembly when version X is newer than version Y.

In some embodiments, the assembly-specific location or locations searched during an implicit override include at least one of the following: a file which has a name in common with the assembly and which is located in directory of the application, a subdirectory of the application which is specified by a search convention, a location which is specified in a list of directory paths, the list being located in the application's directory, a location which is specified in a list of file names (the list is located in the application's directory).

In some embodiments, the binder includes a framework unification portion, which feeds into the implicit override portion. Framework unification per se is already familiar to some people of skill in the computing arts. Framework unification is used, for example, with the Microsoft® .NET™ framework (marks of Microsoft Corporation) to help ensure that a mutually-consistent set of assemblies is loaded. Assemblies in a framework are typically versioned and released as a set.

In the present context, some embodiments provide a binder which has implicit override code and which also includes framework unification code. By virtue of the framework unification code, the binder is configured to check whether an assembly is in a predefined framework of assemblies which are coupled to a managed runtime. The framework unification code includes code to compare a requested_version with a unification_version and to conditionally override the requested_version with the unification_version when the unification_version is greater than the requested_version and the assembly is in the predefined framework. The enhanced binder is configured to invoke the framework unification code to obtain a unification phase result, and then invoke the implicit override code with that unification phase result to obtain an implicit override phase result.

In some embodiments, the binder includes a binding redirection portion, which is fed by the implicit override portion. Binding redirection per se is already familiar to some of skill in the computing arts. Binding redirection in the form of XML binding redirect commands and publisher policy statements can be found, for example, in computing environments that use the Microsoft® .NET™ framework (marks of Microsoft Corporation). In familiar uses, binding redirection is used to modify the result(s) of framework unification. In some embodiments described herein, however, binding redirection modifies implicit override result(s). That is, implicit override computation is injected between the framework unification phase and the binding redirection phase, in some embodiments.

In some embodiments, a binder enhanced with implicit override code also includes binding redirection code which is configured to check for binding redirect commands. The binding redirection code includes code to override the implicit_version in response to a binding redirect command, and the binder is configured to invoke the binding redirection code after invoking the implicit override code. In some embodiments, a binder enhanced with implicit override code also includes both framework unification code and implicit override code.

Some embodiments are characterized by one or more differences between the implicit override and binding redirection phases. In some, the implicit_version does not recite an explicit range, whereas the binding redirection recites that if the currently chosen version is in the range X-Y then use version Z instead. In some, the implicit_version is found outside a configuration file of the application, but the binding redirection is specified inside the configuration file. In some, the implicit_version is specified implicitly by the assembly without requiring an XML declaration, whereas the binding redirection is specified by an XML declaration.

Some embodiments are characterized by a difference between the implicit override and framework unification phases. Specifically, the implicit_version gets updated with the individual assembly, whereas the unification_version gets updated with the framework of assemblies. Making the assembly an out-of-band assembly (one not limited to updates with a framework) permits more frequent updates of the assembly. Framework updates tends to happen at significantly longer intervals than developers of an individual assembly would sometimes prefer, but this inconvenience had been outweighed by the benefits of framework membership, such as extensive compatibility testing of the framework assemblies.

The enhanced binder variations identified above help provide flexibility and certainty when selecting a version of a software library to load in support of an application in a given operating context. The binder responds to aspects of an operating context, such as the operating context's unification_version which represents a framework unification level, the operating context's app local indications that an assembly should be treated as out-of-band with respect to a framework, and the operating context's "final word" binding commands in an application's configuration file, machine configuration, and/or publisher policy.

Binders that choose which assembly version to load often work closely with loaders that locate and load the chosen version of assembly code. In particular, a loader may determine that the assembly version chosen by the binder should not be loaded, because that version of the assembly code has a known security vulnerability. It can be helpful to know whether the assembly version in question has already been vetted. Some embodiments use the fact that an assembly version has previously been loaded in a given operating context as an indication that the assembly version has no known security vulnerability and can therefore be safely loaded again—it was previously vetted. A given operating context includes a given machine or given set of machines configured with software and other data.

In some embodiments, an out-of-band metadata entry is used by an update service to determine whether a vulnerable version of an assembly has ever been loaded in the operating context. The out-of-band metadata entry is sometimes referred to informally herein as a "breadcrumb." The metadata entry may be implemented as a registry key, a file system log entry or other log entry, an element in a tree or list, and/or by using other familiar mechanisms adapted for the uses described herein.

Some embodiments with an app-local-enhanced binder also place a breadcrumb identifying an assembly as an out-of-band assembly when the assembly is loaded. Breadcrumb placement can be based on a list of known out-of-band assemblies, or an out-of-band-servicing attribute of the assembly, for example. In some cases, a servicing library places the breadcrumb. In some cases, an application installation package places the breadcrumb. In some embodiments, one or both of a vulnerable assembly list and an out-of-band assembly list can be patched by servicing.

More formally, some embodiments include an assembly which has previously been loaded at least once in the given operating context. A collection of out-of-band metadata resides in the memory. The out-of-band metadata collection includes an entry for the previously loaded assembly. The memory also includes at least one of the following: (a) out-of-band assembly code which is configured to place the entry in the collection in response to the assembly at least partially matching a list of known out-of-band assemblies when the assembly was previously loaded, (b) an out-of-band-servicing attribute of the previously loaded assembly. In some embodiments, the memory includes a servicing library which includes code configured to place the entry in the collection.

From a procedural perspective, or from the perspective of a configured storage medium (which as noted is not a propagated signal per se), some embodiments cause the computational performance of a technical process for determining which version of a requested assembly will be identified to a loader for loading to support execution of an application. In some, the process includes finding an implicit_version in an assembly-specific location, comparing the implicit_version to another version after the implicit_version is found, and overriding the other version with the implicit_version when the implicit_version is greater than the other version.

In some embodiments, the process further includes performing a framework unification of the requested assembly, and the framework unification produces the other version which is compared to the implicit_version. In some, the process further includes performing a binding redirection of the requested assembly, and the binding redirection overrides the implicit_version. Some embodiments include framework unification, implicit override, and binding redirection.

Some embodiments perform one or more steps to place the out-of-band metadata entry. Entry placement includes creating, copying, or updating data and putting the data in the out-of-band metadata collection. In some embodiments, out-of-band metadata entry for an assembly version is placed even when the assembly is black-listed as vulnerable to a security flaw. The out-of-band metadata entry for an assembly version is placed for the version being loaded, that is, the version chosen after all phases of binding are complete.

The out-of-band metadata entry placement occurs in response to recognition that the assembly is an out-of-band assembly. That recognition may be accomplished in various ways, such as (a) at least partially matching the assembly to a list of known out-of-band assemblies, and in response placing an entry for the assembly in a metadata collection on the computer system; (b) locating an out-of-band-servicing attribute in the assembly, and in response placing an entry for the assembly in a metadata collection on the computer system; and/or (c) applying a service package to the computer system, and as part of applying the service package placing an entry for the assembly in a metadata collection on the computer system.

In some embodiments, the loader will consult a blocklist of vulnerable assembly identities, and if the loaded assembly matches an entry in the blocklist the load will be forcibly failed. More formally, in some embodiments, a loader process finds no indication that the assembly has been previously loaded on a given machine, determines that the assembly is vulnerable to a security flaw, and in response to that determination fails to load the assembly. In the absence of the intentionally forced load failure, the load would normally have succeeded.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
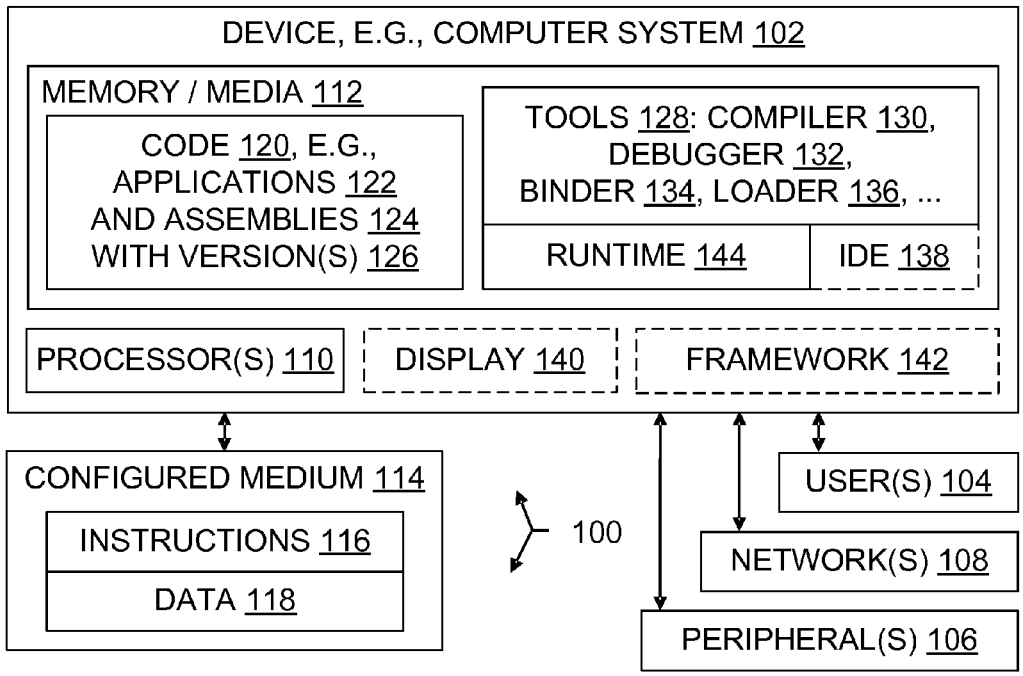
FIG. 1 is a block diagram illustrating a computer system having at least one processor and at least one memory which interact with one another under the control of software for binding and loading assemblies of an application program, and other items in an operating environment which may be present on multiple network nodes, and also illustrating configured storage medium (as opposed to a mere signal) embodiments.

In some current software distribution models, such as the current Microsoft® .NET™ distribution model (marks of Microsoft Corporation), framework libraries are centrally installed and shared machine wide. An assembly binder follows a policy to locate these framework assemblies from a central location, such as a Global Assembly Cache (GAC). While this distribution model has advantages and is widely used, it also poses some challenges. Individual framework components are compelled to wait for a central shipping vehicle (e.g., redistributables, platform updates) to release their new functionality, instead of shipping new releases at their own faster cadence. Also, updates to framework libraries affect all applications installed on the machine.

Some embodiments described herein enable applications to carry application-local versions of framework libraries, which an assembly binder will favor if they have greater versions than those of the in-box copies. In some embodiments, a binder algorithm still maintains an existing list of framework assemblies (known familiarly as a "unification list") for compatibility, but favors the version of the library included in the application package (if it exists and is newer) instead of the one from the redistributable. In some embodiments, the binder algorithm will disallow loading of multiple versions of the same assembly. With some embodiments, out-of-band framework assemblies will be shipped and/or deployed with the application package instead of with a framework release. As a result, newer out-of-band versions of individual framework components can ship and be deployed with application packages outside of the larger, less frequent, and more widely impactful full framework updates. Also, application developers will no longer be compelled to enforce platform update prerequisites or to retarget new framework versions to use new functionality of a framework component. In addition, the effect of consuming out-of-band versions of framework components will be scoped in some embodiments to only the application itself, which avoids possibly unwanted machine wide behavior changes.

Some embodiments described herein may be viewed in a broader context. For instance, concepts such as binding, frameworks, loading, and versions may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving binding, frameworks, loading, and versions are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as choosing an assembly version to bind or determining whether an assembly version chosen for binding is also safe to load. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein create out-of-band assembly metadata entries, and some compare application-local versions with requested or unified versions to choose a version for binding. Third, technical effects provided by some embodiments include out-of-band metadata entries, forced load failures of vulnerable assemblies, and overrides of framework unification version choices. Fourth, some embodiments include technical adaptations such as implicit override enhancements to binders, and out-of-band assembly support in loaders. Fifth, some embodiments modify technical functionality of a binder and/or a loader by implicit override functionality and/or by out-of-band assembly detection and handling functionality, based on technical considerations such as assembly versions and metadata entries. Sixth, technical advantages of some embodiments include more frequent updates of framework assemblies, improved flexibility for choosing assembly versions to bind, and lowered vulnerability to security flaws in out-of-band assemblies.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Vendor" means a commercial or non-commercial organization, individual, or other entity which controls content and/or distribution of code.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as applying, binding, characterizing, checking, comparing, configuring, determining, executing, failing, finding, forcing, identifying, including, invoking, loading, locating, matching, obtaining, overriding, performing, placing, redirecting, requiring, residing, searching, servicing, supporting, updating (and applies, applied, binds, bound, finds, found, forces, forced, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. This specification presumes that a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game application may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media as opposed to being merely a propagated signal. In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, smart phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, a code 120 base with one or more applications 122 includes assemblies 124 (e.g., DLL files and other libraries) which have respective versions 126. "DLL" stands for "dynamic-link library", also known as a "dynamically loaded library". Assemblies 124 may be part of a framework 142, which is a set of assemblies released as an internally compatible group to support multiple applications 122 from multiple vendors. Framework assemblies are often part of an application runtime 144 which provides services that are used by most if not all of the applications running in a given system 102.

Software development tools 128 such as compilers 130, debuggers 132, a binder 134, and a loader 136 assist with software development by producing and/or transforming code 120 for execution by processor(s) 110. The code 120, tools 128, and other items shown in the Figures and/or discussed in the text, may each reside partially or entirely within one or more hardware storage media 112, thereby configuring those media for technical effects which go beyond the "normal" (i.e., least common denominator) interactions inherent in all hardware-software cooperative operation.

In addition to processors 110 (CPUs, ALUs, FPUs, and/or GPUs), memory/storage media 112, display(s) 140, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 138 which provides a developer with a set of coordinated software development tools 128 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
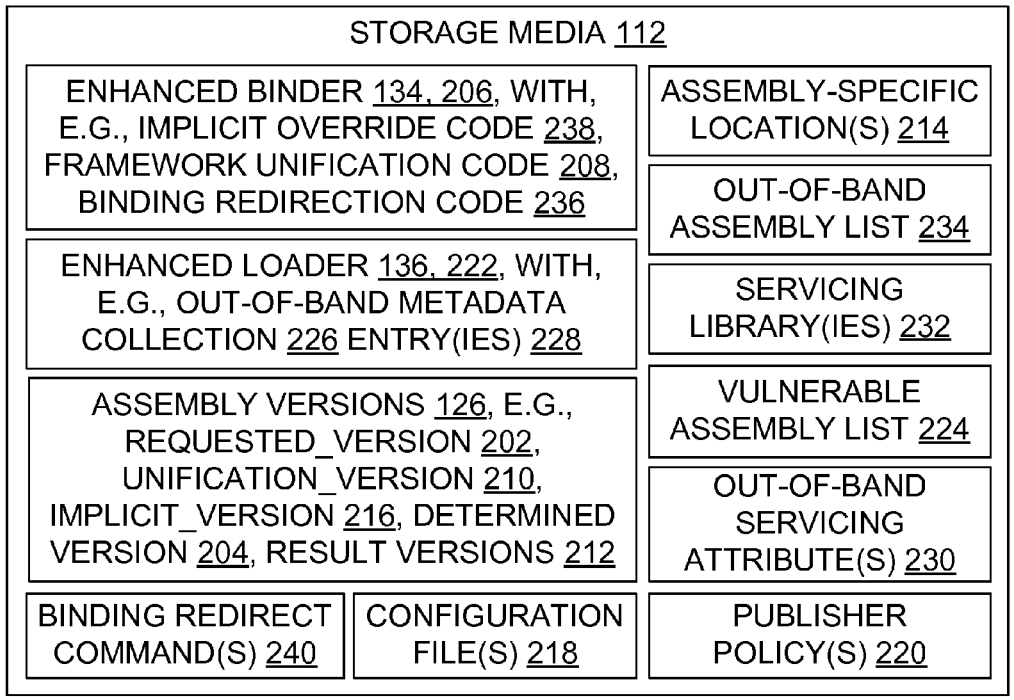
FIG. 2 is a block diagram illustrating aspects of enhanced binding and out-of-band assembly management in an example architecture.

FIG. 2 illustrates aspects of an architecture which is suitable for use with some embodiments. By way of additional context, in some environments 100 after an application 122 is invoked, assemblies 124 used by the application are loaded into memory 112 for execution on an as-needed basis. This is sometimes called "delay-loading" or "lazy loading" of assemblies. Which assemblies are actually needed during execution depends in part on which paths are taken through the application code during execution of the application and its loaded assemblies. When delay-loading is used, assemblies that are not needed are not necessarily loaded.

During execution, the application 122 requests an assembly 124, e.g., foo.dll. The request may be made directly by the application, or it may be made by code running on behalf of the application, such as another assembly or the runtime 144. The request may be proactive (e.g., an application may pre-load certain assemblies to prevent delays later during execution), or the request may be made in response to an exception or another event which occurs when an attempt is made to reference the assembly during execution. In many (but not all) cases, the request to use an assembly will specify a particular version of the assembly, e.g., foo.dll version 2. In this discussion, the requested version of the assembly is called the requested_version and is denoted by reference numeral 202.

After the assembly is requested, a binder 134 determines which version of the assembly will be loaded, and then a loader 136 loads the assembly code into memory so it can execute. The binder is responsible for determining which version 126, 204 of the assembly to use. In some environments, the binder is also responsible for locating that version within a file system or other storage, while in other environments, locating the file to load is the loader's responsibility. The loader 136 is typically responsible for allocating memory 112, copying the assembly code into memory, and adjusting pointers within the code based on the memory address of the copied code. Binders 134 and loaders 136 may also have other responsibilities that are not discussed herein.

For some embodiments, one point of interest to readers will be how and when the binder chooses an assembly version for an application. As to when, the choice of assembly version is made during the application's "bind-time" for that assembly. Bind-time for an assembly begins when a request for the assembly is made, by the application or by code running on behalf of the application. Bind-time for the assembly ends when the binder has determined which version of the assembly to use.

As to how a version is chosen, binding can be enhanced as described herein to include three main phases, which are referred to here as framework unification, implicit override, and binding redirection. The phases occur in that order. But in some situations of interest, no binding redirection occurs, so binding includes only the framework unification phase followed by the implicit override phase. In other situations of interest, binding includes only the implicit override and binding redirection phases. In still other situations of interest, only the implicit override phase occurs.

The framework unification phase is sometimes called simply "unification." The implicit override phase is sometimes called the "app local" or "AppLocal" phase. The binding redirection phase is sometimes referred to using particular mechanisms for binding redirection, such as an app configuration or a publisher policy.

In some embodiments which include an enhanced binder 206, a framework unification procedure or other unification code 208 checks the requested_version 202 of the assembly against a unification_version 210. The unification_version for the assembly was specified in the framework 142 before the application's bind-time. If the requested_version is less than or equal to the unification_version, then framework unification code 208 returns the unification_version. That is, the framework unification phase of enhanced binding produces the unification_version as its result 212. If the requested_version is greater than the unification_version, then framework unification fails. If framework unification fails then either (a) binding fails (in some implementations), or else (b) binding moves on to the implicit override phase (in other implementations).

In some embodiments, the framework 142 includes a collection of assemblies 124 coupled to a managed runtime 144. The framework's unification procedure uses a conservative value for unification_version. That is, the unification_version of the assembly is known to work properly with all other assemblies in the framework. In other words, the assembly versions specified by unification have been tested against one another to help ensure that they interoperate correctly with each other.

In some embodiments, if the requested assembly version has major and minor parts equal to or less than the unification version, the unification result will be the unification_version. For example, if one unifies to 4.0.0.0, then 2.0.0.0 or 4.0.1.0 will be retargeted to 4.0.0.0, but 4.5.0.0 and 5.0.0.0 won't be. The major and minor parts may be defined differently by different vendors, but in general the number to the left of the first (leftmost) decimal point is the major part and the minor part includes at least the number to the right of that first decimal point. The other numbers (if any) to the right of the minor part may be, for example, build or revision numbers.

In some embodiments, code 238 implementing the implicit override phase checks one or more assembly-specific locations 214 for an implicit_version 216 value. For an assembly foo.dll, for example, the implicit override phase may open the foo.dll file in the application's directory or in a subdirectory specified by convention or by a list of directory paths and/or file names that is in a specified location 214, e.g., a foo_versions file in the application's directory. In some embodiments, the implicit override phase parallels a loader probing phase with respect to which locations are checked and in which order. If an implicit_version value is found, and is greater than the unification_version, then the enhanced binder 206 will choose the implicit_version of the assembly. Otherwise, the enhanced binder 206 does not use an implicit_version value to override a unification_version.

In some embodiments, code 236 implementing the binding redirection phase looks for assembly binding redirect commands 240 in an app configuration file 218 or a publisher policy 220. A binding redirect command has the form: if the currently chosen version is in the range X-Y then use version Z instead. An assembly's binding redirect command in an application's app configuration file applies to that assembly when the assembly is being bound to that application. An assembly's binding redirect command in a publisher policy applies to that assembly when the assembly is being bound to any application within the scope of the publisher policy (that is, a given machine). In some embodiments, binding redirection can lower the version of assembly to load (e.g., redirecting version 2.0.0.0 to 1.0.0.0), while unification and implicit override cannot lower the version number.

The implicit override phase is different from the framework unification phase. First, the outcome of the implicit override phase depends in part on the outcome of the framework unification phase, because the implicit_version is compared to the unification_version. Second, the implicit_version gets updated with the individual assembly, whereas the unification_version gets updated with the framework (that is, with a collection of assemblies).

Regarding unification, one of skill may note that an app local binding phase is useful both in cases which involve loading an assembly that is subject to unification as part of the framework 142, and in cases which involve loading an assembly that is not unified because it is not part of the framework. Even if unification is not done, app local binding is valuable because it lets different modules used by an application 122 all reference different versions of an assembly when an operating context loads only one version at runtime per application module. For example, msbuild will put the newest dependency locally. App local also permits a user to specify a version by simply copying, writing, or deleting a file, instead of by the more complex step of authoring a configuration XML command.

The implicit override phase is also different from the binding redirection phase. First, the implicit_version can be overridden by a binding redirect command, so the addition of the implicit phase adds new functionality while preserving the existing functionality of the binding redirection phase. Second, the implicit_version does not recite an explicit range, in contrast with the binding redirect's form which recites: if the currently chosen version is in the range X-Y then use version Z instead. Two more things that separate the implicit override phase from binding redirection are: (1) the version is specified implicitly by a local assembly, so module vendors can include assemblies they wish to target without needing access to the application's config file and (2) the version is specified implicitly by a local assembly, so developers don't need to write out the XML declaration of the binding redirect, a process that can be complex and error-prone.

Some embodiments illustrated by FIGS. 1 and 2 operate at least in part as described in the following pseudocode. Those of skill will understand that for clarity, some binder complexity is omitted from this pseudocode. For example, binding redirects can also act on the pre-unification version if the output would be greater than the unified value.

```
// Binds the requested assembly to the right version. This output will
be used to load the assembly.
Version BindAssembly(Version requestedVersion) {
    Version versionToLoad = requestedVersion;
    if (InFramework) {
        versionToLoad = Max(versionToLoad, UnificationOutput);
    }
    if (AppLocalExists) { // This is not nested in this 'InFramework'
clause and it's not in an else; this test always happens in these
embodiments
        versionToLoad = Max(versionToLoad, AppLocalVersion);
    }
    if (BindingRedirectsExist) {
        versionToLoad = ApplyRedirects(versionToLoad);
    }
    // Publisher policy and machine configuration are applied here
    return versionToLoad;
}
```

After a binder 134 (which may be an enhanced binder 206) determines which assembly version should be loaded, the loader 136 locates a file containing that version of the assembly. The loader 136 may be an enhanced loader 222 which determines whether that version of the assembly has previously been loaded for a given process (in the computer science sense of that term), e.g., by checking a loader cache. The enhanced loader 222 checks a list 224 of assemblies which are known to be vulnerable to security flaws. If this assembly version is known to be vulnerable, then the loader forces a load failure. As an optimization, some embodiments only check the list 224 during the first load on each process (in the computer science sense of that term), and cache the result of the list 224 lookup. Some enhanced loaders check a collection 226 of out-of-band metadata entries 228 ("breadcrumbs") to determine whether this is an out-of-band assembly. If this assembly is an out-of-band assembly, then the loader checks whether the assembly version is vulnerable. Otherwise, if the assembly version has been previously loaded and is not out-of-band, or if the assembly version has not been previously loaded but is not vulnerable, then loading of the assembly is permitted.

In some embodiments, the collection 226 of out-of-band metadata entries 228 contains entries which are made (a) when the assembly has an out-of-band servicing attribute 230, (b) when a servicing library 232 is applied, and/or (c) when the assembly is found on a list 234 of out-of-band assemblies (this list is maintained, e.g., by Framework Setup or by another framework 142 initialization procedure). Thus, in some embodiments, some breadcrumbs are written by the loader and read by the update service, as described in the following paragraph, whereas others are part of the list 234 of out-of-band assemblies.

In some embodiments, the out-of-band metadata entries 228 are read by an update service, such as the Microsoft® Windows® Update service or the Microsoft® Windows Server® Update service (marks of Microsoft Corporation), to determine whether a vulnerable version of a library has ever been loaded on a given machine or given set of machines. That is, the breadcrumb 228 is an indicator of the existence of a version of a DLL file or other library in a given operating context such as a machine.

In some embodiments, the enhanced loader 222 operates at least in part according to the pseudocode below. In this pseudocode, Is_OOB_asssembly represents an out-of-band servicing attribute 230, BreadcrumbNotExist indicates whether an out-of-band metadata entry 228 for the assembly version being loaded is found, and Is_Vulnerable indicates whether that assembly version is known to be vulnerable to a security flaw:

```
if (Is__OOB__asssembly) {
    if(Is__Vulnerable) {
    //Write Breadcrumb 228
    //Fail Load with exception message
    return
    }
        else {
        If(BreadcrumbNotExist) {
          Write Breadcrumb
        }
    }
}
Load__Assembly
```

It will be understood that in most if not all embodiments, an assembly 124 is loaded only once in an application's lifetime for a given module of the application. Once a load happens, the loader and/or binder preserve that state, making them effectively aware that the assembly has previously been loaded. Thus, in some embodiments, if an attempt to load an assembly version is not the first load attempt for this version of the assembly on this system, then the loader checks a collection of assembly metadata entries. An assembly carries metadata (attribute 230) identifying it as an out-of-band assembly. The breadcrumb 228 entry is written to storage 112 to indicate the load of this assembly.

With reference to FIGS. 1 and 2, some embodiments provide a computer system 102 with a logical processor 110 and a memory medium 112 configured by circuitry, firmware, and/or software to provide technical effects described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using items such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, assemblies 124 may be on multiple devices/systems 102 in a networked cloud, an application 122 which requests the assemblies may be stored on yet other devices within the cloud, and the enhanced binder 206 and/or enhanced loader 222 may configure the memory 112 on yet other cloud device(s)/system(s) 102.

Processes

Figure 3:
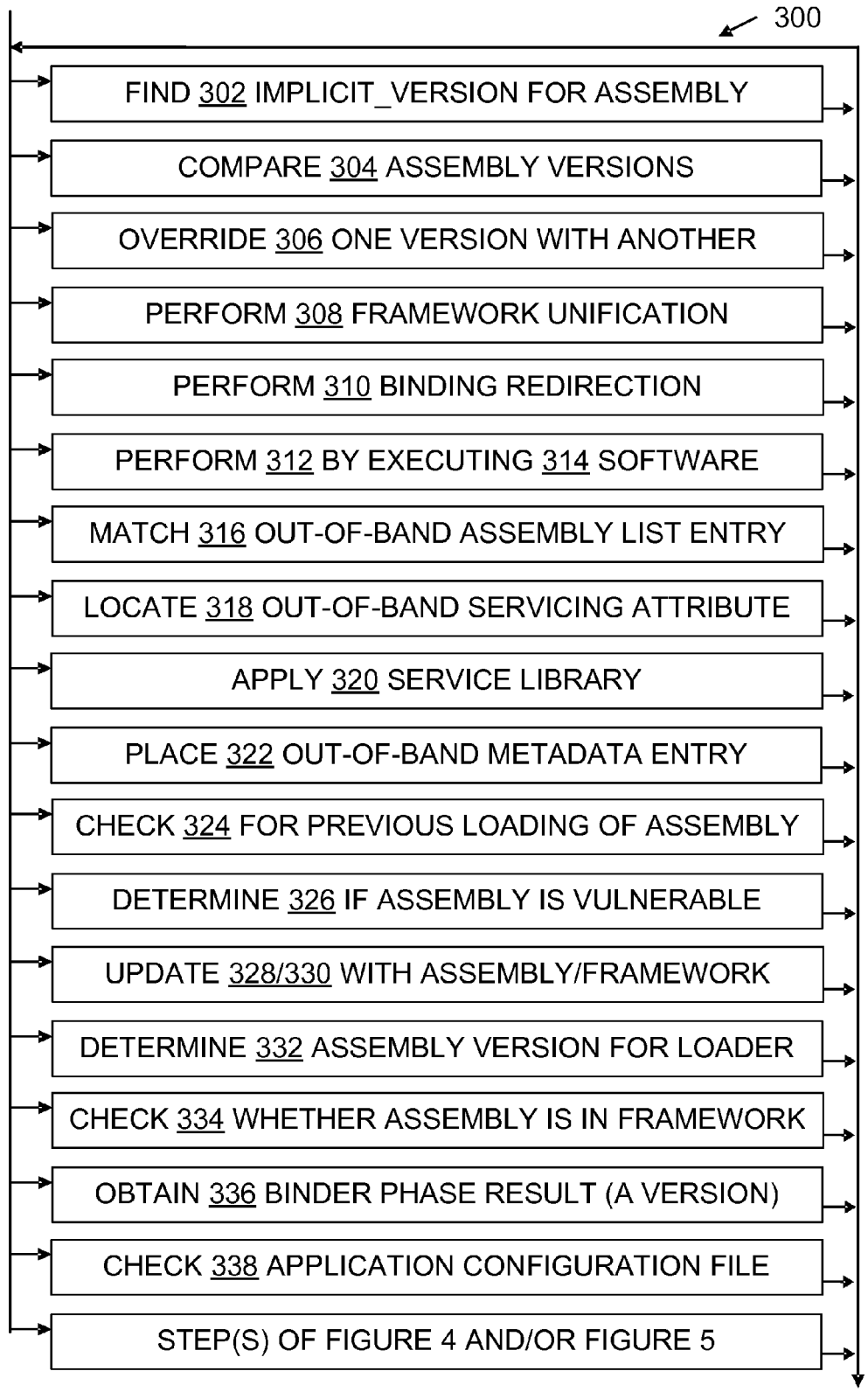
FIG. 3 is a flow chart illustrating steps of some process and configured storage medium embodiments.
Figure 4:
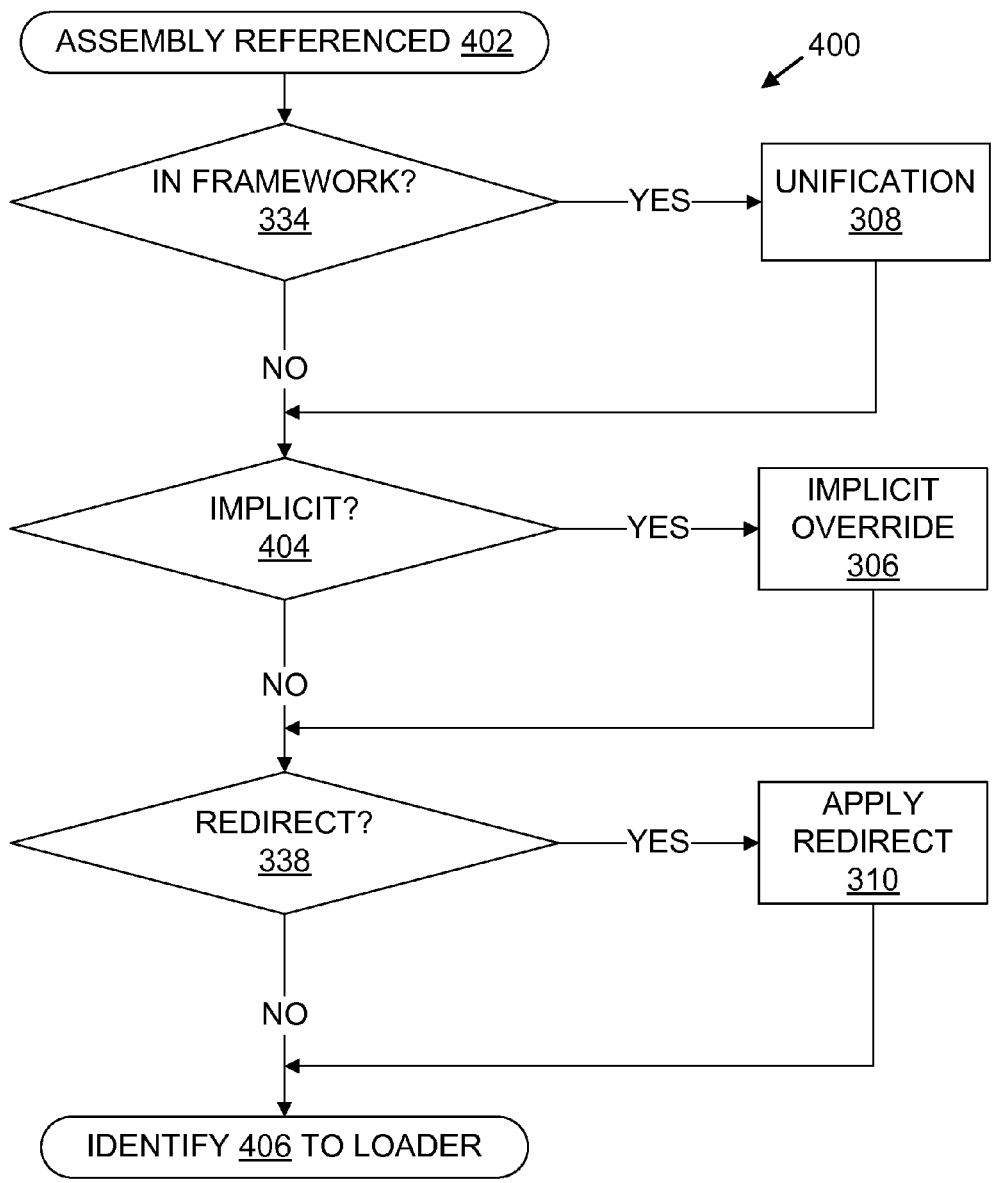
FIG. 4 is a flow chart further illustrating steps of some process and configured storage medium embodiments, with a focus on binding.
Figure 5:
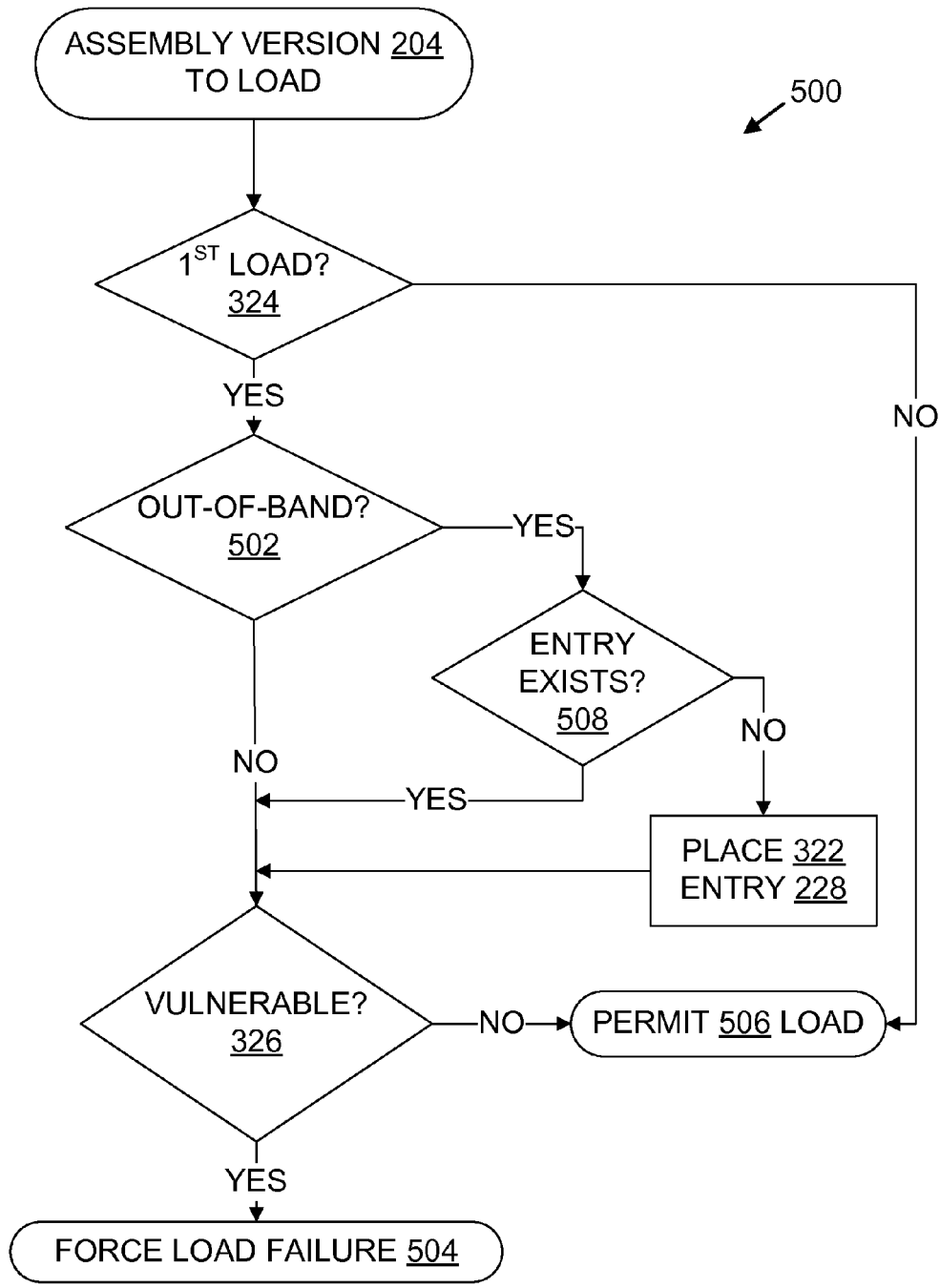
FIG. 5 is a flow chart further illustrating steps of some process and configured storage medium embodiments, with a focus on out-of-band assembly management.

FIGS. 3-5 illustrate some process embodiments, which are collectively represented in a flowchart 300, and further detailed in flowcharts 400 and 500 of FIGS. 4 and 5, respectively. Technical processes shown in the Figures or otherwise disclosed may be performed in some embodiments automatically, e.g., by an enhanced binder 206 and an enhanced loader 222 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

The system embodiments illustrated in FIGS. 1 and 2 operate in ways that are consistent with at least some aspects of the process embodiments illustrated in FIGS. 3 through 5. For example, some embodiments search for and find 302 an implicit_version in at least one assembly-specific location, compare 304 the implicit_version to some other version after the implicit_version is found, and conditionally override 306 the other version with the implicit_version when the implicit_version is greater than the other version.

In some embodiments, the enhanced binder 206 includes a framework unification portion which feeds into the implicit override portion. The binder 206 checks 334 whether an assembly is in the framework 142, e.g., by checking a list which is maintained by the framework's vendor. To perform 308 framework unification, some embodiments compare 304 a requested_version with a unification_version and conditionally override 306 the requested_version with the unification_version when the unification_version is greater than the requested_version and the assembly is in the framework. The enhanced binder invokes the framework unification code to obtain 336 a unification phase result 212, and then invokes the implicit override code with that unification phase result to obtain an implicit override phase result 212. In some embodiments, the implicit_version gets updated 328 with the individual assembly, whereas the unification_version gets updated 330 with the framework 142 of assemblies.

In some embodiments, the binder 206 includes a binding redirection portion, which is fed by the implicit override portion. Binding redirection is performed 310, modifying implicit override result(s) 212. The binding redirection code includes code to override 306 the implicit_version in response to a binding redirect command 240; the enhanced binder 206 invokes the binding redirection code after invoking the implicit override code.

Finding 302, comparing 304, overriding 206, unification performing 308, redirection performing 310, and other steps which perform 312 a specified act or set of acts described herein, may be jointly and severally performed in some embodiments by executing 314 software which is specifically designed to provide the computing system functionality described. Examples of such software include the enhanced binder 206 and its constituent codes 208, 236, 238, the enhanced loader 222, and code which implements pseudocode provided herein, for instance.

In some embodiments, an out-of-band metadata entry 228 (a.k.a. breadcrumb) is used by an update service to determine whether a vulnerable version of an assembly 124 has ever been loaded in a given operating context. Some embodiments place 322 a breadcrumb identifying an assembly as an out-of-band assembly when the assembly is loaded. Breadcrumb placement can be based on matching 316 the assembly to a list 234 of known out-of-band assemblies, or based on locating 318 an out-of-band-servicing attribute 230 of the assembly, for example. In some cases, a servicing library 232 places 322 the breadcrumb when the servicing library is applied 320. Some embodiments check 324 whether an assembly has previously been loaded at least once in the given operating context, using state information that is updated by the loader when an assembly is loaded.

From a procedural perspective, or from the perspective of a configured storage medium (which as noted is not a propagated signal per se), some embodiments cause the computational performance of a technical process for determining 332 which version of a requested assembly (a.k.a. referenced 402 assembly) will be identified 406 to a loader for loading to support execution of an application. In some, the process includes checking 404 for an implicit_version, and in some cases finding 302 an implicit_version in an assembly-specific location 214, comparing 304 the implicit_version to another version after the implicit_version is found, and overriding 306 the other version with the implicit_version when the implicit_version is greater than the other version.

In some embodiments, the process further includes performing 308 a framework unification of the requested assembly, and the framework unification produces the other version which is compared to the implicit_version. In some, the process further includes checking 338 an application configuration file or a machine configuration file or a global assembly cache (or other location) for an application binding redirect, publisher policy 220, machine binding redirect, and/or other binding redirect command 240 and when such commands are found performing 310 a binding redirection of the requested assembly. As used herein, "binding redirect command" means a statement, policy, or other command in an application configuration, a machine configuration, a publisher policy, or another form, which specifies an assembly binding. The binding redirection overrides the implicit_version. Some embodiments include framework unification, implicit override, and binding redirection.

Some embodiments perform one or more steps to place 322 the out-of-band metadata entry if the entry does not yet exist 508. Entry placement 322 includes creating, copying, or updating data and putting the data in the out-of-band metadata collection 226. In some embodiments, out-of-band metadata entry for an assembly version is placed 322 even when the assembly is black-listed as vulnerable to a security flaw. The out-of-band metadata entry placement occurs in response to recognition 502 that the assembly is an out-of-band assembly. That recognition may be accomplished in various ways, such as (a) at least partially matching 316 the assembly to a list of known out-of-band assemblies, (b) locating 318 an out-of-band-servicing attribute in the assembly, and/or (c) applying 320 a service package to the computer system.

In some embodiments, after checking 324 that an assembly has not previously been loaded on the system 102, the loader will consult a blocklist of vulnerable assembly identities to determine 326 if the assembly is vulnerable. If the loaded assembly matches an entry in the blocklist the load will be forcibly failed 504, if no match is found then the load will be permitted 506.

Some embodiments provide a technical process for a computing system to automatically determine whether to load a version of a requested assembly that has been identified to a loader for loading to support execution of an application in the computing system. The process includes the computational steps executing software instructions in the computing system which locate an out-of-band metadata collection 226 in the computing system, determine that at least one of the following out-of-band assembly conditions is satisfied: (a) the requested assembly matches 316 an entry in a list of known out-of-band assemblies, (b) the requested assembly contains 318 an out-of-band-servicing attribute, and then place 322 an entry for the requested assembly in the out-of-band metadata collection on the computer system in response to determining that at least one of the out-of-band assembly conditions is satisfied.

In some embodiments, the technical further includes determining 326 that the requested assembly is vulnerable to a security flaw and in response to that determination failing to load the requested assembly. In some, the process determines 326 that the requested assembly is not known to be vulnerable to a security flaw and in response to that determination permits 506 the loader to load the requested assembly. Some embodiments determine 502 that the requested assembly is an out-of-band assembly by reading the entry for the requested assembly in the out-of-band metadata collection.

Some embodiments (but not all) combine use of the out-of-band metadata collection 226 with use of the app-local unification. Accordingly, in some embodiments one of the out-of-band metadata collection technical processes described above also includes app-local unification steps, such as executing software instructions in the computing system which find an implicit_version in an assembly-specific location, and executing software instructions in the computing system which compare the implicit_version to an other version after the implicit_version is found.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as an enhanced binder 206, implicit override code 238, an enhanced loader 222, a collection 226 of metadata entries 228, out-of-band servicing attributes 230, and a list of assembly-specific location 214, in the form of data 118 and instructions 116, read from a removable medium 114 and/or another source such as a network connection, to form a configured medium. The configured medium 112 is capable of causing a computer system to perform technical process steps for binding and loading as disclosed herein. FIGS. 1 through 5 thus help illustrate configured storage media embodiments and process embodiments, as well as system and process embodiments. In particular, any of the process steps illustrated in FIGS. 3 through 5, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from App-Local Unification (ALU) documentation. ALU specifies software which has been prototyped by Microsoft Corporation. Aspects of the ALU program and/or documentation are consistent with or otherwise illustrate aspects of the embodiments described herein. However, it will be understood that ALU documentation and/or implementation choices do not necessarily constrain the scope of such embodiments, and likewise that ALU and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

The Dot Net™ framework (a.k.a. .Net™ framework, marks of Microsoft Corporation) provides a stable and secure platform over which developers can build applications. In the current model of the framework libraries are installed centrally and shared machine wide. However this centralization poses some challenges. Individual framework components wait for a centralized shipping vehicle in order to get their functionality out, which can inhibit the rate at which a component would otherwise innovate. As a result of the latency of framework releases, framework components are also constrained from reacting to customer feedback as quickly as desired. Finally, because of the centralized nature of the framework, a single update will affect machine wide applications, which can be disruptive.

Some embodiments described herein alter the mechanism used by the framework to load libraries, to allow loading libraries from an application local location based on version precedence, in addition to an existing central shared location. This alteration allows framework libraries to ship as independent components at their own cadence and helps speed up their reaction to customer feedback.

In some embodiments, a distribution mechanism for these libraries includes a NuGet package manager, which is a zip archive of DLL files put into an application-local path. It may appear that this localization of libraries will cause the conventional approach of centralized servicing of the framework to break down. However, some embodiments allow an easy way for update services to reliably detect and update framework libraries that are shipped local to the application. Some embodiments also prevent unserviced libraries from being loaded and provide a mechanism to scavenge dead bits from a system. In some embodiments, fixes will be shipped via an existing update mechanism, using existing deployment technology, while installing a publisher policy 220 to roll vulnerable DLLs forward to the serviced version of the library.

By way of background, Microsoft® Update and Windows® Update services (marks of Microsoft Corporation) provide a centralized mechanism for servicing centrally installed components. However, they do not work like embodiments described here for non-centralized components because these update services cannot run scans on a system; the can only look at specific machine wide known locations in order to do servicing.

As additional background, a different approach is taken in some Microsoft® SQL Server® Compact (marks of Microsoft Corporation) environments. They track some local libraries, but are limited in that they rely on cataloging a known set of libraries that are part of a product in order to permit them to be updated in an out-of-band manner. They are also limited in that the tracking code lives in the application.

As additional background, a Windows® Graphics Device Interface (GDI+; mark of Microsoft Corporation) security issue addressed some application local considerations, but did so based on a scan of the entire system, which is very expensive. Another background example is the Microsoft® C Runtime (CRT), namely, the Visual C++® runtime (marks of Microsoft Corporation). This runtime allows for loading local linked into the application or centrally; the only mode that is centrally serviced is the centrally loaded mode.

Some embodiments described herein change the binder to allow framework libraries to ship within applications and change the mechanism that will be used to service framework libraries that will ship with an application. One aspect of some embodiments is to generalize the Dot Net™ framework binder (mark of Microsoft Corporation). The current framework has a rigid binding model, which dictates where it can look for shareable libraries. Some changes include generalizing the binding algorithm to expand the list of locations a shareable library can be loaded from, and changing the binding algorithm to use version precedence to load the latest version of a shareable library from an application local location. These innovations will enable shareable libraries to ship and be used by an application regardless of other versions of that library that may be on that box (i.e., that machine).

Some changes involve making sharable libraries centrally serviceable. Moving to an application local model could make shareable libraries much harder to service. But some embodiments define a model to identify a library as an application local framework library, a model to catalog and check 324 loads of these application local libraries, a model to track the location of these libraries for future scavenging, a mechanism to allow released framework libraries to also be serviced 320, and a mechanism to make security vulnerable libraries be failed 504 on first load.

A traditional approach to servicing relies on a central location which has an indicator that a library is installed. Some setup authoring has the ability to either put assemblies/libraries to a central location or to write metadata/registry keys to a known location. However some embodiments with application local libraries do not impose such deployment considerations. Some assume that an application along with its libraries will be simply copied to the client machine. In such an environment one has no mechanism to copy the application libraries to a known location or write the registry keys/meta data to a known location. Instead, mechanisms in the run-time collect this information on assembly load.

For example, consider a library named "System.Foo.dll" which has loaded at least once. In some embodiments, if System.Foo.dll has an assembly metadata attribute Servicing ("true") set then during the load of the assembly, a breadcrumb of the following form or a functionally similar form C:\ProgramData\Microsoft\NetFramework\System.Foo, version 1.0.0.0, culture neutral, abbcdacc123.txt will be created. It will be understood by those of skill that the formats shown here are only non-limiting examples. Also, in some embodiments a breadcrumb without all parts of the assembly identity (e.g., without the version number) is created additionally, to allow more fuzzy matching of assembly name. In some embodiments, the breadcrumb can be stored in the registry, or in some other location.

In some embodiments, if System.Foo.dll has an entry in a known registry key hive, then during the load of the assembly, a breadcrumb of the following form or a functionally similar form HKLM\Software\Microsoft\NetFramework\System.Foo, version 1.0.0.0, culture neutral, abbcdacc123.txt will be created.

In some embodiments, if System.Foo.dll takes a dependency on a Microsoft.Servicing.dll, then during the load of the assembly, Microsoft.Servicing gets invoked because of behavior coded into Microsoft.Servicing and System.Foo and a breadcrumb of the following form or a functionally similar form C:\ProgramData\Microsoft\NetFramework\System.Foo, version 1.0.0.0, culture neutral, abbcdacc123.txt will be created.

None of these approaches depend on any special steps being taken by the application developer who was consuming System.Foo.dll in an application. They are examples of approaches that could be used to solve the technical problem of determining when an application local library is resident on a client machine. The breadcrumb formats shown are merely examples; other formats may be used in other embodiments.

Now consider the technical problem of preventing vulnerable code from running, which translates here to the technical problem of preventing the vulnerable code from loading. Some embodiments determine on first load of a library that the library is an out-of-band library by analyzing library meta-data. On the presence of the known piece of library meta-data, logic is triggered in the runtime to write assembly identity information to a machine wide location. Some embodiments on first load of a library assembly determine the library is an out-of-band library by the inclusion of the assembly identity in a known data-store. This allows assemblies to be retroactively opted into servicing. On the presence of the assembly identity in the data store, logic is triggered in the runtime to write assembly identity information to a machine wide location.

Several observations can be made with regard to opting in to servicing. In some embodiments, in order for a framework library to be serviceable, it complies with certain policies. To support identifying new out-of-band libraries, all framework libraries to be serviced declare an assembly level attribute AssemblyServicable("true") which the Common Language Runtime (CLR) loader inspects for. An alternative option uses a pseudo custom attribute that sets a flag in the assembly header. Another option is to use the AssemblyMetadata attribute and add metadata into the assembly to opt into servicing; the key in question could be "Servicing" and the value could be true or false. However, if an approach used is not strongly typed, there is no design time enforcement or error checking. Another option is to auto-identify out-of-band libraries, based on whether the load location is from a non-GAC location and whether the identity in the assembly to load has the public key that matches that identity of a framework assembly. An advantage of this option is that it imposes no restriction on the developer other than that the library should be signed with a framework key.

Attention is also directed to the technical problem of identifying previously released out-of-band libraries. For out-of-band libraries that have already been released without this attribute 230, some embodiments create an opt-in list 234, which will be installed to the registry or the file system. This list will contain all the libraries that have already been treated or otherwise characterized as out-of-band and which one would like to be able to service. The list can be secured (e.g., using an Access Control List or other mechanism) so that only admins can change it. The registry key for this list can be located, for example, at HKEY_LOCAL_MACHINE\SOFTWARE\Microsoft\NET Framework Setup\NDP\Servicing\<AssemblyIdentity> as the value, that if observed, the binder or loader should write a breadcrumb for.

With regard to an application opting in to be serviceable when consuming an out-of-band library, in some embodiments if the application opts in to the implicit override binding model, then the application is automatically opted in to the enhanced loader 222 servicing model. This approach does not allow an application to make the decision of whether or not it should be serviced. The option of taking a servicing update is left to the administrator of the machine, to either download a fix for all the applications that might be affected or not, via the familiar update service mechanism(s).

With regard to the impact of opting into servicing, one impact of the CLR binder seeing this attribute 230 on an assembly or seeing the assembly name on the service list 234 is to indicate to the enhanced loader 222 that it is loading an out-of-banded assembly that has opted into servicing. To annotate this, the CLR binder should write a breadcrumb in the form of a directory entry to a location such as, for example, CAProgramData\Microsoft\CLR\<AssemblyName>_<PublicKeyToken>_<Major>_<Minor>_<Buid>_<Revision>\<UserNameHash>\BC.txt or C:\ProgramData\Microsoft\NetFramework\<AssemblyName>_<PublicKeyToken>_<Major>_<Minor>_<Buid>_<Revision>\<UserNameHash>\BC.txt, to give two of the many possible examples.

For the registry the structure would look like: HKEY_LOCAL_MACHINE\SOFTWARE\Microsoft\NET Framework Setup\NDP\OOBServicing\<AssemblyName>_<PublicKeyToken>_<Major>_<Minor>_<Buid>_<Revision>

The presence of the portion of the directory entry preceding <UserNameHash>\BC.txt, or of the portion of the registry entry key following OOBServicing, would indicate to update service detection logic that a specific version of this assembly was indeed loaded. The contents of BC.txt would contain the location(s) from which the DLL was loaded.

With regard to ACLs for directory and/or registry in some embodiments, a user account that created the directory would not be able to delete it; only administrators can delete the breadcrumb. One user cannot view another user's breadcrumb information. A user cannot delete their own breadcrumb. If privacy is a concern, an implementation can use a UserNameHash instead of the UserName to encode the path. In the event the breadcrumb is not written, due to a disk space issue or an ACL issue, for example, the binder continues to load the assembly and does not cause a binding failure, and a diagnostic log entry can be made accordingly.

Some embodiments that identify an out-of-band library do the following. On first load, determine the library is an out-of-band library by the inclusion of a certain servicing library 232. When this servicing library is loaded, it writes assembly identity information about the assembly that included it to a machine wide location. In some embodiments, this approach involves building a servicing library that any other framework library that needs to be serviced takes a dependence on. The mechanism uses an initializer, namely, a method which is always called on assembly load, to invoke the package that writes the breadcrumb. This mechanism makes the identification of an out-of-band library an implicit action of the library developer and hence can replace use of an attribute 230 for that purpose. However, an issue with this approach is that it leaves a servicing library with no mechanism to be serviced, which makes it a higher risk feature to implement for some frameworks, including familiar Microsoft®.NET™ frameworks (marks of Microsoft Corporation). It may nonetheless be a viable option for third party assemblies that would like to build this functionality in the presence of some update service distribution mechanism.

Some embodiments prevent a vulnerable library from loading for the first time. On first load the runtime checks a data store for a list 224 of known vulnerable libraries. If the library being loaded matches the identity of the vulnerable library, the load is failed 504, logic is triggered in the runtime to write assembly identity information to a machine wide location, and an error message with a link to resolve the issue is logged for the user to take action. Specifically, in some embodiments before the loader 222 loads an identified out-of-band library, the loader checks in the HKEY_LOCAL_MACHINE\SOFTWARE\Microsoft\NET Framework Setup\NDP\OOBBlocklist\<AssemblyIdentity Value> hive for a value name which matches with the Assembly Identity being loaded. If a match is found then the loader 222 fails to load the assembly (e.g., using a familiar killbit mechanism) and uses the corresponding data to throw a FileLoadException. The data point to a website address or other Uniform Resource Locator of the suggested fix, which could be incorporated into the exception message. The exception thrown can be a SecurityException, which is already one of the exceptions that is thrown by Assembly.Load( ), with the metadata added into it. Some embodiments throw a FileLoadException, with an inner SecurityException.

For a library that has never loaded when it runs for the first time, some embodiments have a feature built into the binder that will know that a servicing event has occurred and will fail to load the assembly. On this failure, it will write a breadcrumb to a known location and point to a place to run the update mechanism, which will then go and update the library the same way that one would do with the breadcrumb-based approach.

In some embodiments, an assembly identity looks like System.Composition.AttributedModel, Version=1.0.16.0, Culture=neutral, PublicKeyToken=b03f5f7f11d50a3a.

In other embodiments, an assembly identity could be a Globally Unique Identifier (GUID), or just the assembly's file name, or a combination of file name and file version, for example. The assembly identity is a way to uniquely identify a given version of an assembly.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 through 5 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system comprising:
   at least one processor;
   a memory in operable communication with the processor(s); and
   a binder residing in the memory and having implicit override code, the binder configured to interact with the processor and memory to determine which version of a requested assembly will be identified to a loader for loading to support execution of an application;
   the implicit override code including code to search for an implicit_version in at least one assembly-specific location, the implicit override code also including code to compare the implicit_version to an other version after the implicit_version is found, the implicit override code also including code to conditionally override the other version with the implicit_version when the implicit_version is greater than the other version;
   wherein the binder also includes framework unification code which is configured to check whether the requested assembly is in a predefined framework of assemblies which are coupled to a managed runtime, the framework unification code including code to compare a requested_version with a unification_version and to conditionally override the requested_version with the unification_version when the unification_version is greater than the requested_version and the requested assembly is in the predefined framework of assemblies, and wherein the binder is configured to invoke the framework unification code to obtain a unification phase result and then invoke the implicit override code with the unification phase result to obtain an implicit override phase result.

2. The computer system of claim 1, further comprising a list of known out-of-band assemblies, namely, assemblies which are updated more frequently than the predefined framework of assemblies.

3. The computer system of claim 1, wherein the binder also includes binding redirection code which is configured to check for binding redirect commands, the binding redirection code including code to override the implicit_version in response to a binding redirect command, and wherein the binder is configured to invoke the binding redirection code after invoking the implicit override code.

4. The computer system of claim 3, wherein the implicit_version is found outside a configuration file of the application, and the binding redirect command is specified inside the configuration file.

5. The computer system of claim 1, wherein the computer system further comprises an assembly which has previously been loaded at least once on the computer system, and wherein a collection of out-of-band metadata resides in the memory, the out-of-band metadata collection including an entry for the previously loaded assembly, and the computer system memory also includes at least one of the following: (a) out-of-band assembly code which is configured to place the entry in the collection in response to the previously loaded assembly at least partially matching a list of known out-of-band assemblies when the assembly was previously loaded, (b) an out-of-band-servicing attribute of the previously loaded assembly.

6. The computer system of claim 1, wherein the computer system further comprises an assembly which has previously been loaded at least once on the computer system, and wherein a collection of out-of-band metadata resides in the memory, the out-of-band metadata collection including an entry for the previously loaded assembly, and the computer system memory also includes a servicing library which includes code configured to place the entry in the collection.

7. A computer-readable storage memory configured with data and with instructions that when executed by at least one processor causes the processor(s) to perform a technical process for determining which version of a requested assembly will be identified to a loader for loading to support execution of an application, the technical process comprising the computational steps of:
  finding an implicit_version in an assembly-specific location;
  comparing the implicit_version to an other version after the implicit_version is found;
  overriding the other version with the implicit_version when the implicit_version is greater than the other version;
  checking whether the requested assembly is in a predefined framework of assemblies which are coupled to a managed runtime;
  comparing a requested_version with a unification_version and conditionally overriding the requested_version with the unification_version when the unification_version is greater than the requested_version and the requested assembly is in the predefined framework of assemblies; and
  obtaining a unification phase result and then obtaining an implicit override phase result.

8. The computer-readable storage memory of claim 7, wherein the process further comprises performing a framework unification of the requested assembly, and the framework unification produces the other version which is compared to the implicit_version.

9. The computer-readable storage memory of claim 8, wherein the process further comprises performing a binding redirection of the requested assembly, and the binding redirection overrides the implicit_version.

10. The computer-readable storage memory of claim 7, wherein the process further comprises performing a binding redirection of the requested assembly, and the binding redirection overrides the implicit_version.

11. The computer-readable storage memory of claim 7, wherein the process occurs on a computer system, and the process further comprises at least one of the following:
  (a) at least partially matching the requested assembly to a list of known out-of-band assemblies, and in response placing an entry for the requested assembly in a metadata collection on the computer system;
  (b) locating an out-of-band-servicing attribute in the requested assembly, namely, an attribute which identifies the requested assembly as an out-of-band assembly, and in response placing an entry for the requested assembly in a metadata collection on the computer system;
  (c) applying a service package to the computer system, and as part of applying the service package placing an entry for the requested assembly in a metadata collection on the computer system.

12. The computer-readable storage memory of claim 11, wherein the process further comprises determining that the requested assembly is vulnerable to a security flaw and in response to that determination fails to load the requested assembly.

13. The computer-readable storage memory of claim 7, wherein the finding step finds the implicit_version in at least one of the following assembly-specific locations:
  a file which has a name in common with the requested assembly and which is located in a directory of the application;
  a subdirectory of the application which is specified by a search convention;
  a location which is specified in a list of directory paths, the list being located in the application's directory;
  a location which is specified in a list of file names, the list being located in the application's directory.

14. The computer-readable storage memory of claim 7, wherein the process comprises performing a binding redirection of the requested assembly, and the process is further characterized in at least one of the following ways:
  the implicit_version does not recite an explicit range, and the binding redirection recites that if the currently chosen version is in the range X-Y then use version Z instead;
  the implicit_version is found outside a configuration file of the application, and the binding redirection is specified inside the configuration file;
  the implicit_version is specified implicitly by the requested assembly without requiring an XML declaration, and the binding redirection is specified by an XML declaration.

15. The computer-readable storage memory of claim 7, wherein the requested assembly belongs to a framework of assemblies, the process comprises performing a framework unification of the requested assembly, and the process is further characterized in that the implicit_version gets updated with the requested assembly, whereas a unification_version gets updated with the framework of assemblies.

16. A technical process for a computing system to automatically determine whether to load a version of a requested assembly that has been identified to a loader for loading to support execution of an application in the computing system, the technical process comprising the computational steps of:

executing software instructions in the computing system which locate an out-of-band metadata collection in the computing system, the out-of-band metadata collection containing entries which identify out-of-band assemblies, namely, assemblies which are updated more frequently than a predefined framework of assemblies coupled to a managed runtime, the out-of-band metadata collection entries implemented using at least one of the following: a registry key, a log entry, a file system log entry, an element in a list, and element in a tree;

executing software instructions in the computing system to determine that at least one of the following out-of-band assembly conditions is satisfied:
  (a) the requested assembly matches an entry in a list of known out-of-band assemblies,
  (b) the requested assembly contains an out-of-band-servicing attribute, namely, an attribute which identifies the requested assembly as an out-of-band assembly; and then executing software instructions in the computing system which place an entry for the requested assembly in the out-of-band metadata collection on the computing system in response to determining that at least one of the out-of-band assembly conditions is satisfied;

and wherein the technical process further comprises:
    executing software instructions in the computing system which find an implicit_version in an assembly-specific location; and
    executing software instructions in the computing system which compare the implicit_version to an other version after the implicit_version is found.

17. The technical process of claim 16, wherein the process further comprises determining that the requested assembly is vulnerable to a security flaw and in response to that determination failing to load the requested assembly.

18. The technical process of claim 16, wherein the process further comprises determining that the requested assembly is not known to be vulnerable to a security flaw and in response to that determination permitting the loader to load the requested assembly.

19. The technical process of claim 16, wherein the process further comprises determining that the requested assembly is an out-of-band assembly by reading the entry for the requested assembly in the out-of-band metadata collection.

20. The technical process of claim 16, wherein the process finds the implicit_version in at least one of the following assembly-specific locations:
  a file which has a name in common with the requested assembly and which is located in a directory of the application;
  a subdirectory of the application which is specified by a search convention;
  a location which is specified in a list of directory paths, the list being located in the application's directory;
  a location which is specified in a list of file names, the list being located in the application's directory.

* * * * *